United States Patent [19]

Clark

[11] Patent Number: 4,979,469
[45] Date of Patent: Dec. 25, 1990

[54] PORTABLE PET POTTY AND WETTING WALL

[76] Inventor: Nanette Clark, 2977 Milton Pl., Bronx, N.Y. 10465

[21] Appl. No.: 370,457

[22] Filed: Jun. 23, 1989

Related U.S. Application Data

[62] Division of Ser. No. 166,231, Mar. 10, 1988.

[51] Int. Cl.$^5$ ............................................. A01K 29/00
[52] U.S. Cl. ..................................................... 119/161
[58] Field of Search ................................ 119/1, 29, 61

[56] References Cited

U.S. PATENT DOCUMENTS

| | | | |
|---|---|---|---|
| 2,525,654 | 10/1950 | De Ville | 119/61 |
| 2,729,383 | 1/1956 | King | 229/104 X |
| 3,890,931 | 6/1975 | Saver | 119/1 |
| 4,011,836 | 3/1977 | Temel | 119/1 |
| 4,117,555 | 10/1978 | Dennis | 119/1 |
| 4,271,544 | 6/1981 | Hammond | 119/1 X |

*Primary Examiner*—Gene Mancene
*Assistant Examiner*—R. Thomas Price
*Attorney, Agent, or Firm*—Ostrolenk, Faber, Gerb & Soffen

[57] ABSTRACT

A portable pet potty and a wetting wall for male dogs or the like. The potty includes an elongate trough for receiving animal waste and a pair of pet constraining blocks to the left and right of the trough. A set of latching bars connect the trough to the blocks and, together, the trough, blocks and bars define barricaded areas on the left and right sides of the trough which the pet will avoid. Consequently, the pet will straddle both the trough and the barricaded areas so that its body will be precisely aligned over the trough, preventing accidents. The position of the blocks relative to the trough is adjustable for accommodating differently sized pets. The wetting wall is formed of several panel pieces including a left corner piece and a right corner piece each of which provides a floor, a back wall and a left wall in the left corner piece and a right wall in the right corner piece. The floors slope toward their centers where a central hole directs waste fluid into a removable drawer below the hole. The left corner piece has a set of pegs while the right corner piece has corresponding peg receiving holes. Together, the pegs and holes permit the corner pieces to be tightly connected to provide a contiguous back wall which forms a wetting wall for a dog. If desired, one or more intermediate add-on pieces are interposed between the corner pieces to enlarge the size of the wetting wall.

10 Claims, 2 Drawing Sheets

U.S. Patent  Dec. 25, 1990  Sheet 1 of 2  4,979,469
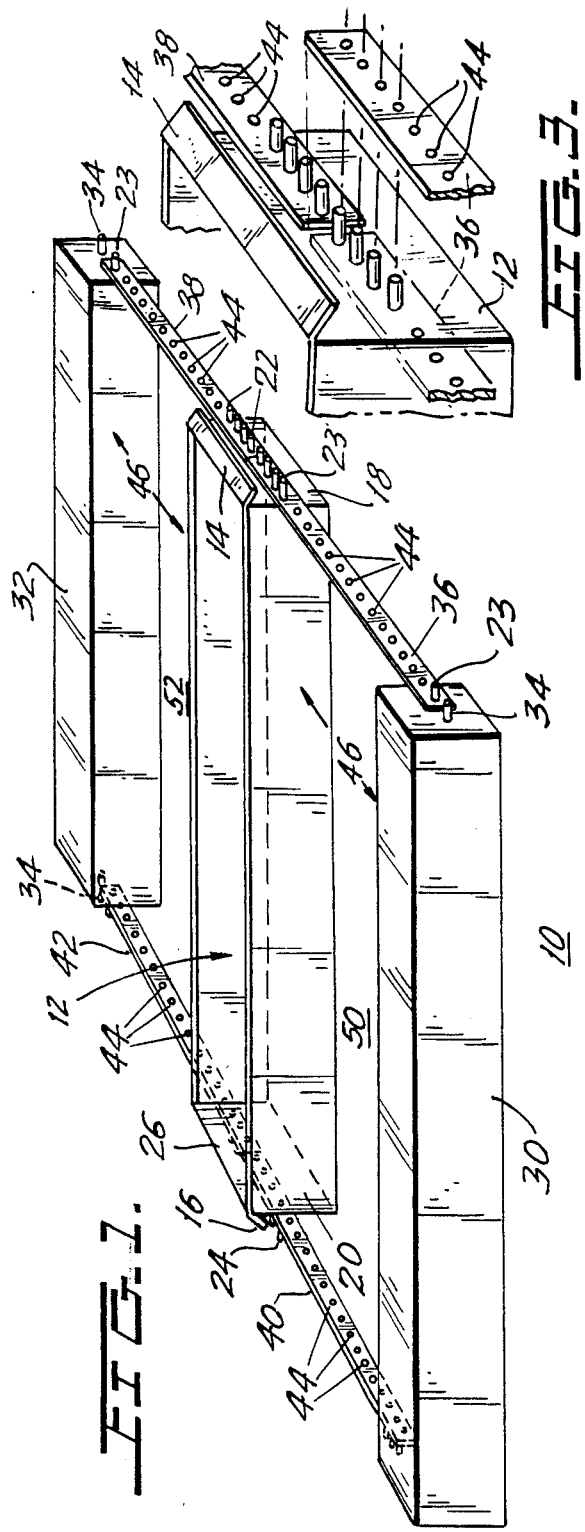
FIG. 1.
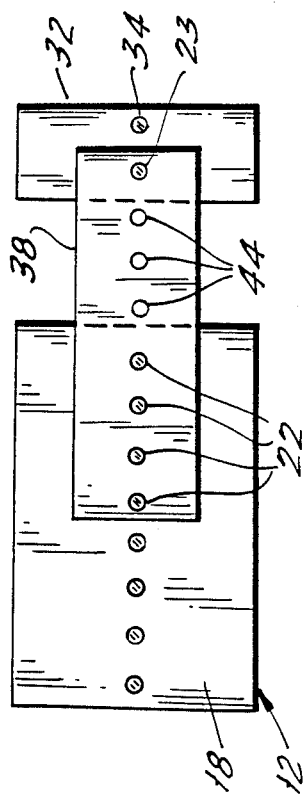
FIG. 3.
FIG. 2.

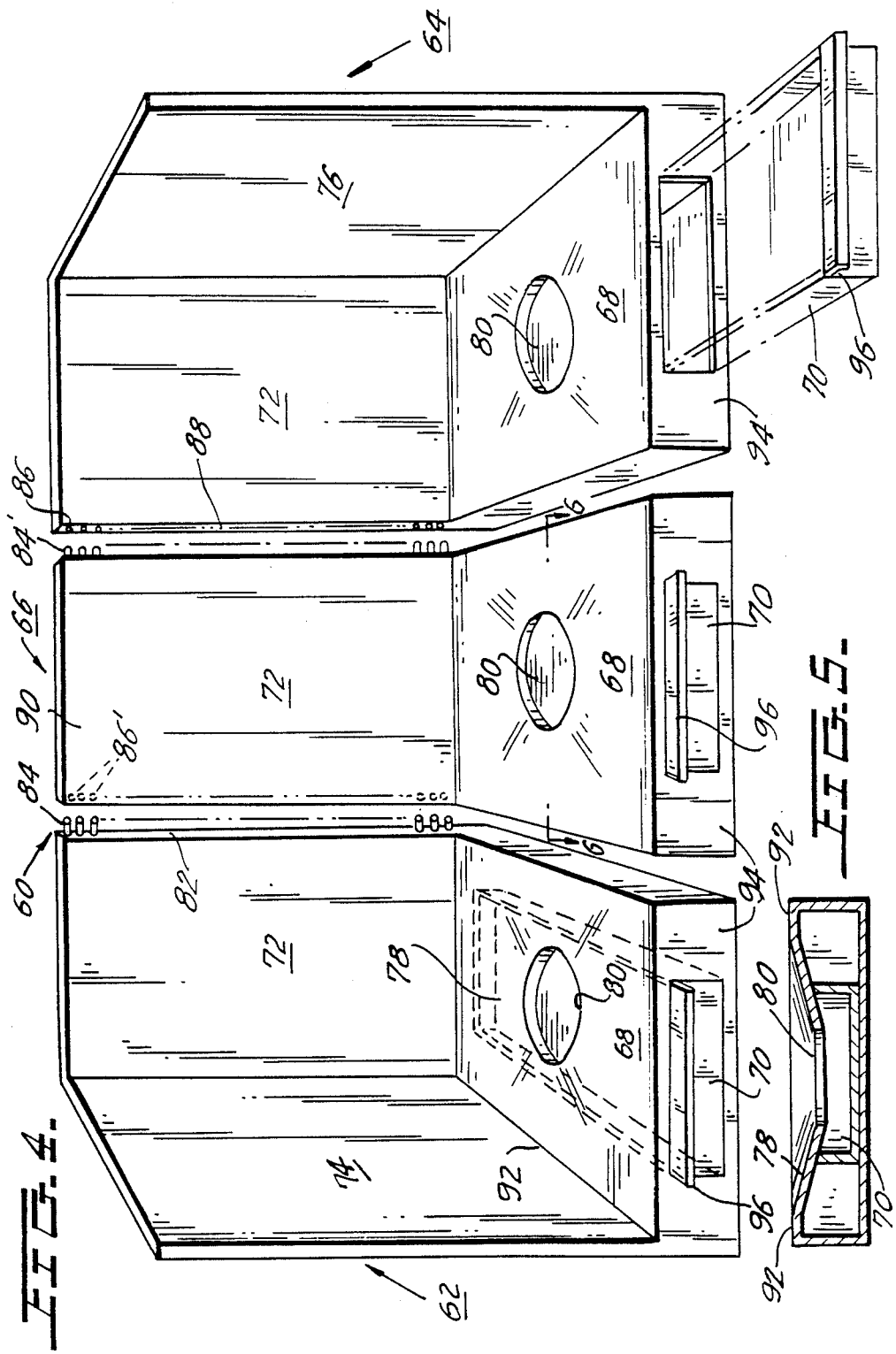

PORTABLE PET POTTY AND WETTING WALL

This is a division of application Ser. No. 07/166,231, filed Mar. 10, 1988.

BACKGROUND OF THE INVENTION

The present invention relates generally to commodes for pets, especially for dogs, and also for monkeys trained to assist handicapped persons, and, more particularly, to a variable sized wetting wall and to a potty having adjustably locatable orienting blocks for orienting the body of a pet relative to the potty.

The prior art discloses various animal commodes for different purposes. For example, U.S. Pat. No. 2,671,427 illustrates a portable animal commode which has the general appearance of an attache-case. The bottom of the case serves as a potty and the openable upright cover is decorated with leafy branches or the like to simulate natural conditions.

U.S. Pat. No. 3,735,735 describes a similar commode which is however further modified to include an opening in the bottom tray for receiving a removable bag. Disposable material flows into the bag and is discarded.

An oblong, low rimmed, pan with a relatively tall collapsible back wall and partially completed side walls define the general structure for a dog commode that is described in U.S. Pat. No. 1,773,141.

U.S. Pat. No. 3,890,931 describes a sanitary disposal box for pets which has a base with surfaces which slope toward a central hole and with a removable tray which fits under the base. The base is surrounded by walls except for an entranceway for the pet.

While the aforementioned sanitary facilities serve their purpose, they have certain shortcomings. For example, none of them provides an effective wetting wall for dogs. Also, once constructed or assembled, the size of any of the above-described facilities is fixed and cannot be further adjusted. Further, the prior art commodes provide nothing for orienting the pet relative to the refuse collecting tray to prevent messy accidents.

SUMMARY OF THE INVENTION

It is an object of the present invention to provide sanitary facilities for a pet which may be simply and inexpensively manufactured.

It is another object of the present invention to provide sanitary facilities which may be easily cleaned and maintained.

It is another object of the present invention to provide a variably sized wetting wall for male dogs, the size of the wetting wall being adjustable by the dog's owner.

It is yet another object of the present invention to provide a potty for a pet, the potty including adjustable pet orienting blocks for orienting the pet relative to the potty.

It is a still further object of the present invention to provide a pet orienting potty which is readily assemblable by the owner of the pet and adaptable for accommodating differently sized pets.

In realizing the foregoing and other objects the present invention provides a potty facility for pets, for example dogs and monkeys, wherein the potty itself is comprised of a generally oblong and rectangularly shaped trough for receiving a pet's waste products, the trough being formed with a pair of handles so that it is easily carried about. In fact, the width of the trough is narrow to project roughly only below the excretory area of the pet and the trough is further shaped to facilitate, particularly for the physically impaired, the tasks of carrying and flushing the contents of the trough down a toilet bowl.

The trough is centered between a pair of pet orienting blocks which are aligned parallel to the length of the trough. One of the blocks is located to the left and the other to the right of the trough. The trough and the blocks each have several pegs, preferably circular pegs, projecting from their front and back sides. The trough and blocks are then interconnected with several latching bars which extend from the trough to the blocks and have a line of peg receiving holes sized to provide a tight fit on the pegs. Preferably, there are two latching bars at the front, one extending from the trough to the right block and the other to the left block. The same arrangement of latching bars appears at the back side.

The blocks, trough and latching bars define a first, generally long and narrow, barricaded area to the left of the trough and a similar area to the right of the trough. The barricaded areas are equally sized since both blocks are equally spaced from the trough. The distance separating the blocks is adjustable and selected to match the distance between the left and right legs of the pet while it eliminates. A pet will not enter the barricaded areas and will position its body to straddle both the trough and the blocks with its left and right legs respectively positioned to the left and to the right and outside the barricaded areas. This will reliably align the excretory area of the pet directly over the trough and avoid the problem and consequences of aligning the body of a pet relative to a rather narrow potty, regardless of the actual size of the pet.

For male dogs and monkeys, the invention provides a wetting wall which in its simplest configuration includes a left corner piece and a right corner piece. Each of the pieces has a thickened base or platform and a removable drawer that slides in and out of the base through the front. The upper surface of the platform slopes generally toward the center where a refuse receiving hole is provided for receiving the waste product of the animal and directing it into the removable drawer below the hole. It is preferred that the width, from side wall to side wall, of the drawer be kept small, and only slightly larger than the diameter of the hole to provide an exceedingly portable drawer. Each of the corner pieces is further provided with a back wall and a side wall. The side wall is disposed, respectively, to the left and to the right in the left and right corner pieces. The corner pieces stand side by side, their side walls facing one another and back walls lying in the same plane.

A plurality of pegs project from the free edge of the back wall of the left corner piece, toward the facing free edge of the back wall of the right corner piece. These pegs are aligned with and face a set of peg receiving holes in the free edge of the back panel of the right corner piece. The pegs and peg receiving holes permit the two back walls to mate with one another to form a single contiguous flat wetting wall. This wetting wall is disposed to the rear of platforms which are themselves similarly combined to provide a contiguous platform. The corner pieces may be easily assembled or disassembled for being stored or transported. They are preferably molded of plastic. Consequently, it is easy to keep the facility clean and sanitary.

To form a larger wetting wall, the present invention provides one or more intermediate add-on pieces, each having a platform and a back wall of the type described above, but no side wall. The intermediate piece is designed to fit directly between the aforementioned corner pieces. Consequently, the left free edge of the back wall in the intermediate piece is provided with a set of the above-mentioned peg receiving holes and its other free edge facing the right corner piece has a set of the protruding pegs for being mated to the right corner piece. It is a simple matter to position the intermediate piece between the corner pieces and join the three back walls and platforms to form an enlarged contiguous wetting wall and a contiguous platform for a larger pet.

Several intermediate pieces may be interposed between the corner pieces to obtain any size of wetting wall and platform. The resulting wetting wall will have an elongate and contiguous platform with several spaced holes each of which communicates into the drawer below it. During use, the pet stands off and in front of the platform so that the fluid refuse will be efficiently collected and directed into one or more of the removable drawers. It is desirable that the drawers of the wetting wall as well as the bottom of the trough of the previously described potty accommodate a chemical deodorizer to neutralize objectionable smells.

Other features and advantages of the present invention will become apparent from the following description of the invention which refers to the accompanying drawings.

BRIEF DESCRIPTION OF THE DRAWINGS

FIG. 1 is a perspective of a waste receiving trough for a pet, including a pair of pet orienting blocks.

FIG. 2 is a front view of the trough, block, and latching bar.

FIG. 3 is a front perspective of the trough of FIG. 1 together with the latching bars.

FIG. 4 is a perspective of a wetting wall in accordance with the present invention.

FIG. 5 is a cross-section through line 6—6 in FIG. 4.

DETAILED DESCRIPTION OF THE DRAWINGS

Referring to FIGS. 1-3, a pet orienting potty 10 has a container-like trough 12 which is formed of molded plastic and includes a pair of protruding molded plastic handles 14 and 16 for carrying and easily manipulating the trough 12, for example, to facilitate flushing of the trough contents down a toilet. One of the handles 14 is located slightly below the top front exterior side 18 of the trough 12 while the other one 16 is located in a similar position below the top back exterior side 20. The trough 12 is generally elongate and preferably measures 2 inches in height, 3 ⅛ inches in width and 18 inches in length.

A first set of pegs 22 extend on a straight horizontal line along the front side 18 of the trough 12 and a similar set of pegs 24 project from the back side 26 of trough 12. The pegs are made of plastic and are preferably molded integrally with the trough 12.

Aligned to the length of trough 12 and spaced to its left and right are, respectively, a left block 30 and a right block 32. Each blocks 30 and 32 has corresponding pegs 34 along its front and back sides, as in trough 12. The pegs 22, 24, 34 are preferably circular. It is also possible for their cross-section to taper very gradually to a narrower diameter at the free end 23.

The blocks 30 and 32 are then joined to trough 12 at the front, by means of latching bars 36 and 38 and, at the back, by latching bars 40 and 42. Each of latching bars 36-42 has a plurality of peg receiving holes 44, shaped to tightly receive pegs 22, 24 and 34. The latching bars are designed to be latched onto the trough 12 at one end and onto a respective one of the blocks 36-42 at their other ends, as illustrated.

The relative position of the blocks 30 and 32 to the bars 36-42 is adjustable and is selected to obtain a desired equal spacing 46 from each of blocks 30 and 32 to trough 12. The size of the spacing between adjacent holes 44 preferably matches the spacing between pegs 34. This spacing may, however, be reduced by factors of 2, 4, 8, etc. to obtain finer resolution in the positioning of the blocks 30 and 32 relative to trough 12. Preferably, the lengths of the bars 36-42 is about equal to the width of trough 12 to facilitate storing of potty assembly 10. Further, it is possible to provide a single long latching bar in place of the pair of latching bars at the front and back of trough 12.

The trough 12 can be made to accommodate some type of chemical deodorizer in order to neutralize unpleasant odors.

Assembled together, the pet orienting potty 10 provides a long and narrow barricaded area 50 to the left of trough 12 and a similar area 52 to the right of trough 12 so that the pet will position its left and right legs directly outside these areas and its body in perfect alignment with trough 12. For a pet with a wider body, the blocks 30 and 32 are positioned further out on the latching bars 36-42. In any case, regardless of the size of the pet, the pet orienting potty 10 meets the objective of carefully positioning a pet over the trough 12 to avoid accidents. This pet potty provides a male and female potty and a female urinal which is easily assembled/disassembled. It is therefore highly portable and particularly suitable for being stored away, if desired.

Referring to FIGS. 4 and 5, a wetting wall assembly 60 includes a left corner piece 62, a right corner piece 64 and an optional intermediate add on piece 66. The pieces 62-66 are preferably fabricated of plastic for ease in cleaning and for keeping them in good sanitary condition. The corner pieces 62 and 64 have a relatively thick floor or platform 68 and a removable drawer 70 which slides in and out of floor 68, a back wall 72 which forms a portion of a wetting wall, as well as a left side wall 74 in left corner piece 62 and a right side wall 76 in the right corner piece 64. The intermediate piece 66 has the floor 68, removable drawer 70 and back wall 72, but lacks a side wall. The upper surface 78 of the individual floors 68 slopes down from the sides toward a hole 80, the hole 80 communicating into the removable drawer 70 below.

The free edge 82 at the right of the back wall of left corner piece 62 has a plurality of spaced thick pegs 84 which project toward the adjacent back wall and extend down the side of the corner piece 62. A complementary set of peg receiving holes 86 dot the left edge 88 of the back wall 72 of right corner piece 64. A similar set of pegs 84' and peg receiving holes 86' are formed on intermediate piece 66.

However, in the simplest configuration, the intermediate piece 66 is omitted and the left and right corner pieces 62 and 64 are joined directly together by the pegs 84 which are fitted tightly into the peg receiving holes 86. The resulting structure provides a contiguous back wall 90 which serves as a wetting wall for a male dog. The left and right side walls 74 and 76 cooperate with the back wall 90 to prevent splashing and the floors 68 are tightly joined to provide a contiguous and leak proof floor with a pair of holes 80 for receiving refuse.

To accommodate a larger dog, intermediate piece 66 is interposed between corner pieces 62 and 64 to provide a larger back wall 90 and platform 68 as illustrated in FIG. 4. While a single add on intermediate piece 66 is illustrated in FIG. 4, more than one such piece may be included to construct a still larger wetting wall to accommodate a dog of any size.

The width of the platform/back wall of intermediate piece 66 may, but need not, equal the corresponding width of corner pieces 62 and 64. Also, as with the pegs 22 of trough 12, the pegs 84 and 84' may have a slightly tapering cross-section to provide a tighter fit for the pegs 84 in peg receiving holes 86 and 86'.

Typical dimensions contemplated for a corner piece 62, 64 provide back and side walls which are 18 inches high, 12 inches wide floor 68, and a depth, measured from front to back, of 9 inches. The periphery 92 of floors 68 is flat and of the same height in all the pieces to provide a neat and tight fitting of the pieces 62, 64 and 66. The height of surface 78 of floors 68 should be low enough to permit use of the wetting wall by male dogs of all heights. The size of hole 80 preferably measures 3 inches. Each of the drawers 70 closes flush with the front 94 of floors 78, and back of drawers 70 should, of course, extend beyond holes 80 and preferably reach to back walls 72. Each of drawers 70 is molded with a curved plastic handle 96 on the front to allow for easy removal. As with trough 12, the wetting wall 60 is preferably designed to accommodate some type of chemical deodorizer, particularly in drawers 70, in order to neutralize unpleasant odors.

Consequently, the present invention achieves its aims of providing a potty for male and female pets which is highly portable, variably sized, easily storable and suitable for positioning a pet of any size at a precise position over a trough which forms a potty. The wetting wall embodiment is distinguishable from prior art wetting walls in providing an infinitely expandable wetting wall to accommodate the length of any dog.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A potty facility for pets, comprising:
   a trough forming a container for receiving animal waste;
   a first pet orienting block spaced away from and disposed to the left of the trough and a second pet orienting block spaced away from and disposed to the right of the trough; and
   latching means for latching the trough to the first and second blocks.

2. A potty facility as in claim 1, wherein the respective spacing from the first and second blocks to the trough is adjustable.

3. A potty facility as in claim 2, wherein the first and second blocks have respective rectangular cross-sections, the trough and the blocks being elongate and extending parallel to one another.

4. A potty facility as in claim 2, wherein the latching means comprises first pegs on the trough, second pegs on the first block and third pegs on the second block, latching bars having peg receiving openings therealong for receiving the pegs, the latching bars extending from the trough to the first and second blocks and being effective for coupling the trough and the blocks together.

5. A potty facility as in claim 4, in which the trough, blocks and latching bars define a first barricaded area to the left of the trough and a second barricaded area to the right of the trough for respectively positioning the left and right legs of a pet outside and to the left and right of the barricaded areas.

6. A potty facility as in claim 5, wherein the trough and the blocks each have a respective front side and back side, the first, second and third pegs projecting respectively from the front and back sides of the trough and the blocks.

7. A potty facility as in claim 4, wherein the pegs are spaced from one another at a predetermined distance and wherein the peg receiving openings in the latching bars are spaced from one another by the predetermined distance.

8. A potty facility as in claim 1, including at least one handle on the trough.

9. A potty facility as in claim 1, wherein the trough is fabricated of plastic.

10. A potty facility as in claim 1, wherein the trough is elongate and has a rectangular cross-section.

* * * * *